United States Patent [19]

Lejdegard

[11] 4,010,670
[45] Mar. 8, 1977

[54] INTERNAL SPLINE DRIVE CONFIGURATION FOR THREADED FASTENERS

[75] Inventor: Sixten Harald Lejdegard, Ramnas, Sweden

[73] Assignee: Bulten-Kanthal Aktiebolag, Sweden

[22] Filed: Mar. 7, 1975

[21] Appl. No.: 556,286

[30] Foreign Application Priority Data

Mar. 8, 1974 Sweden ............................ 7403089

[52] U.S. Cl. ................................................. 85/45
[51] Int. Cl.² ........................................ F16B 23/00
[58] Field of Search .................... 85/45, 9 R, 61; 145/50 A, 50 R; 10/27 R; 279/9 R

[56] References Cited

UNITED STATES PATENTS

| 2,066,484 | 1/1937 | Phillips | 85/45 |
| 2,079,056 | 5/1937 | Warren | 85/9 R X |
| 2,375,249 | 5/1945 | Richer | 85/9 R X |
| 2,969,250 | 1/1961 | Kull | 85/45 X |
| 3,354,757 | 11/1967 | Grimm et al. | 85/45 X |
| 3,400,626 | 9/1968 | Bergere | 85/9 R |

FOREIGN PATENTS OR APPLICATIONS 1,558,026   1/1969   France ...................... 85/45

*Primary Examiner*—Ramon S. Britts
*Attorney, Agent, or Firm*—Hill, Gross, Simpson, Van Santen, Steadman, Chiara & Simpson

[57] ABSTRACT

An internal spline drive formation for screws is provided wherein the spline drive formation comprises a plurality of circumferentially alternating equiangularly spaced grooves and splines, said splines being defined in part by part-cylindrical surfaces and said grooves being defined in part by surfaces which, when viewed in plan, are arcuate to form a parabola-like line in that the radius of curvature is very small at the regions of intersection between the spline side surfaces and the groove bottom and increases gradually towards the center line of the groove bottoms.

Also disclosed is a screw driving tool the bit end of which comprises an external spline drive formation having a surface which, when viewed in plan, comprises an outer cylinder having sunk therein a plurality of equiangularly spaced grooves, defined in part by reentrant part-cylindrical surfaces, the regions of intersection between said grooves and said outer cylinder being sharp as contrasted to curved.

1 Claim, 4 Drawing Figures

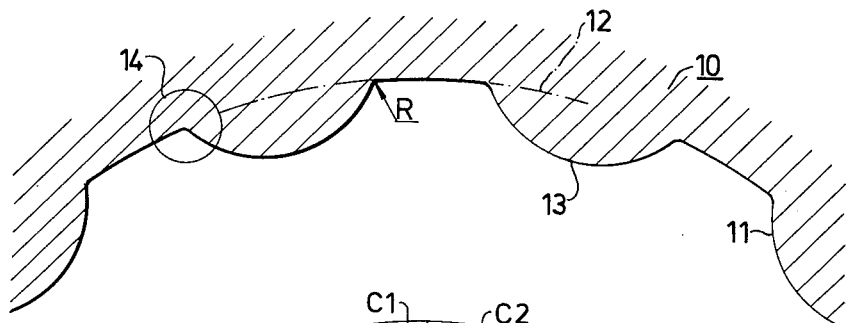
Fig. 1 (Prior art)
Fig. 2 (Prior art)
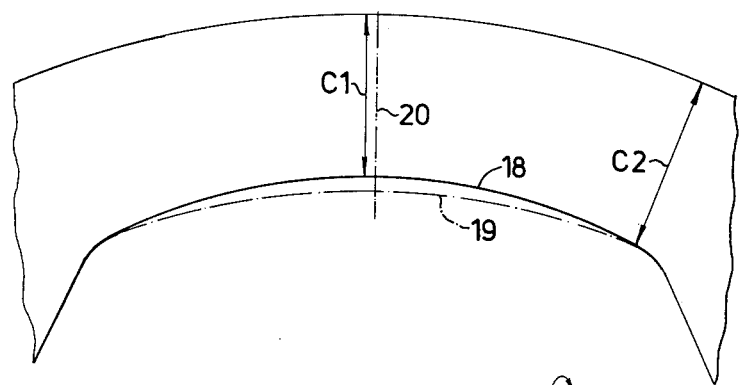
Fig. 3
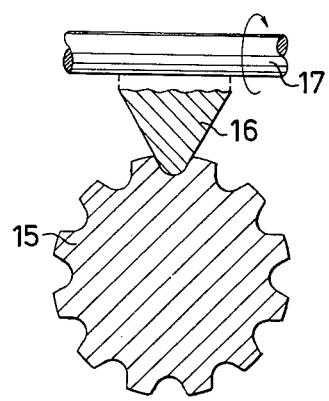
Fig. 4

INTERNAL SPLINE DRIVE CONFIGURATION FOR THREADED FASTENERS

FIELD OF THE INVENTION

This invention relates to a rotatable threaded fastener having an internal drive formation which comprises a plurality of equiangularly spaced grooves between which there are formed drive splines.

BACKGROUND OF THE INVENTION

The U.S. Standard Aerospace 1159 relates to a configuration which may be used for the external drive formation of flange screws and flange nuts, as well as for the internal drive formation of screws having a cylindrical head or having a head of the recessed type.

Generally, the said Aerospace standard 1159 configuration may be described as a configuration which, when viewed in plan, comprises a cylinder having a plurality of grooves defined in part by re-entrant part-cylindrical surfaces and equiangularly spaced about its periphery, the regions of intersection of the grooves with the cylinder being curved and the radius of the part-cylindrical groove being many times larger than that of said curved region of intersection.

In my copending allowed patent application, U.S. Ser. No. 445,920 for a CONFIGURATION FOR NUTS AND BOLT HEADS, filed in the U.S. patent office on Feb. 26, 1974, now U.S. Pat. No. 3,969,974, I have disclosed that, as far as external drive formations are concerned, the curved regions of intersection of the part-cylindrical grooves with the cylinder may advantageously be substituted by planar surfaces.

As set forth in my said co-pending patent application Ser. No. 445,920, such planar surfaces at the regions of intersection may also be used with external drive formations of a slightly different type. These slightly different external drive formations similarly, when viewed in plan, comprise an outer cylinder wherein are sunk a plurality of grooves. The grooves have a curved bottom surface which merges with two planar inclined side surfaces. Nuts and bolts having an external drive formation of this last mentioned type are presently brought on the market under the registered Trade Mark HIGRIP.

Internal drive formations according to the present U.S. Standard Aerospace 1159 suffer from two drawbacks, one being that the screw driving tools to be used for tightening screws having such an internal drive formation are unnecessarily expensive in manufacture, and the other one being that this particular internal drive formation does not permit use of screw driving tools of different designs, such as those adpated primarily to be used with screws of the so called TRI-SQUARE type and similar tools.

OBJECTS OF THE INVENTION

One important object of the present invention is to provide an improved form of drive formation which tends to overcome or reduce the above mentioned drawbacks of prior art internal spline drive fasteners.

SUMMARY OF THE INVENTION

According to the invention there is provided an internal spline drive formation comprising a plurality of circumferentially alternating equiangularly spaced grooves and splines, said splines being defined in part by part-cylindrical surfaces and said grooves being defined in part by surfaces which, when viewed in plan, are arcuate to form a parabola-like line in that the radius of curvature is very small at the regions of intersection between the spline side surfaces and the groove bottom and increases gradually towards the center line of the groove bottoms.

ON THE DRAWING

FIG. 1 represents part of an internal spline drive formation of prior art;

FIG. 2 represents part of a screw head having an internal spline drive formation similarly of prior art but slightly different from the construction shown in FIG. 1;

FIG. 3 represents, in an enlarged scale, a portion of a screw head having an internal spline drive configuration according to the invention;

FIG. 4 shows diagramatically one step of the manufacture of a screw driving tool according to the invention.

AS SHOWN IN THE DRAWING

FIG. 1 of the drawing shows, in general outline, the shape of a drive formation of the spline drive type, this spine drive being of the internal type and of the configuration as defined in the U.S. Standard Aerospace 1159. The fastener head is indicated by the numeral 10 and the driving surface 11 is a cylinder 12 which is broken at 12 equiangularly spaced positions by convex drive splines 13 defined in part by a part-cylindrical surface which has a radius of curvature which is several times smaller than the radius of curvature of the cylinder 12.

Between each spline 13 and the adjacent part of the cylinder 12, there is a region of intersection, such as that encircled at 14. In conventional spline drive fasteners, having an internal drive formation, this region of intersection is curved, the radius of curvature being several times smaller than that of the spline 13 as will be appreciated from the fact that the curved region cannot clearly be distinguished in FIG. 1 for reasons of scale.

Now, with reference to FIGS. 1 and 4, if the curvature R at the above mentioned regions of intersection could be avoided, whereas all the other configurations and dimensional relations might be maintained unchanged, then considerable advantages would be obtained with respect to the manufacture of the screw drivers to be used with internal spline drive formations of the present type. As will be noted from FIG. 4, if the said regions of intersection might be sharp as contrasted to curved, then the bit end of the screw driver, generally denoted 15, may be formed by a simple grinding or milling operation, such as by means of a cutter 16 rotating on a shaft 17.

However, to omit the said curvature would not be possible if other steps are not taken, as this would lead to an objectionable stress concentration at the said region of intersection, as has been indicated by the arrows E in FIG. 2.

To move the circle or cylinder 12, FIG. 1, outwardly to permit accomodation of a screw driver bit end of the configuration as shown in FIG. 4, would mean a corresponding decrease of the wall thickness of the screw head, which is objectionable because of the strength requirements.

According to the invention, as shown in FIG. 3, the bottom of each groove between the drive splines 13 is defined in part by a part-cylindrical surface which, when viewed in plan, is arcuate to form a parabols-like line 18 in that the radius of curvature is very small at the region of intersection between the spline side surface and the groove bottom and increases gradually toward the center line 20 of the groove bottom. This configuration is in contrast to the normal Aerospace 1159 configuration which has been indicated by the dashed line 19 in FIG. 3.

The dashed-line 19 has a center of curvature which is the axis of the fastener. The line 18 has a shorter radius, and a center of curvature, which, as scaled in the drawing, is located substantially 25 percent of the distance from the axis to the line 19.

It will be appreciated by those skilled in the art that this new configuration lends itself to accomodation of screw driving tools of some other configurations, such as those designed primarily to be used with screws of Tri-square, Inbus, 12-point and Twin-Six configurations, which screw drivers cannot presently be used for screws according to the U.S. Standard Aerospace 1159.

The new configuration may be said to be based on the realization of the fact that stress concentrations at the discussed curved regions of intersection cannot be avoided entirely and that the dangerous section for cracks would be the section C2, FIG. 2, rather than section C1, FIG. 2. As a consequence, according to the invention, section C1 may be made smaller than section C2, without diminishing the averall strength of the screw head.

I claim as my invention:
1. A rotatable threaded fastener having an internal spline drive formation, comprising:
   a. 12 splines equally angularly spaced about the axis of the fastener, said splines being defined at least in part by convexly-curved segments of cylindrical surfaces;
   b. 12 circumferentially arranged grooves having bottoms alternating with said splines;
   c. each end of each of said groove bottoms intersecting an adjacent spline surface to define 24 regions of intersection, each region of intersection having a very small radius of curvature and lying at a common radius from said axis of the fastener; and
   d. the bottom of each of said grooves being defined by a concavely curved segment of a cylindrical surface having a radius of curvature which is less than the length of said common radius, its center of curvature being located at a point substantially 25 percent of the length of said common radius from said axis, the radius of each groove bottom increasing slightly with respect to said axis from said regions of intersection toward the center of the groove.

* * * * *